US012771462B2

(12) United States Patent
Zheng et al.

(10) Patent No.: US 12,771,462 B2
(45) Date of Patent: Oct. 20, 2026

(54) PARAMETER ADJUSTMENT METHOD AND SYSTEM USING PARAMETER ADJUSTMENT MODEL

(71) Applicant: Global Technology Inc., Ningbo (CN)

(72) Inventors: Xujun Zheng, Ningbo (CN); Chao-Hung Tsai, Ningbo (CN); Guowei Ge, Ningbo (CN); Xiaoyu Zhou, Ningbo (CN)

(73) Assignee: Global Technology Inc., Ningbo (CN)

( * ) Notice: Subject to any disclaimer, the term of this patent is extended or adjusted under 35 U.S.C. 154(b) by 275 days.

(21) Appl. No.: 18/618,178

(22) Filed: Mar. 27, 2024

(65) Prior Publication Data

US 2025/0226894 A1 Jul. 10, 2025

(30) Foreign Application Priority Data

Jan. 8, 2024 (CN) ......................... 202410026329.9

(51) Int. Cl.

| | |
|---|---|
| ***H04B 17/10*** | (2015.01) |
| ***G06N 3/042*** | (2023.01) |
| ***G06N 3/048*** | (2023.01) |
| ***G06N 3/08*** | (2023.01) |
| ***H04B 17/00*** | (2015.01) |
| ***H04B 17/309*** | (2015.01) |
| ***H04B 17/40*** | (2015.01) |
| ***H04N 7/10*** | (2006.01) |

(52) U.S. Cl.
CPC ....... *H04B 17/103* (2015.01); *H04B 17/0085* (2013.01); *H04B 17/347* (2023.05)

(58) Field of Classification Search
CPC .............. H04B 17/103; H04B 17/0085; H04B 17/347; H04B 17/40; G06N 3/042; G06N 3/048; G06N 3/08; H04N 7/10
See application file for complete search history.

(56) References Cited

U.S. PATENT DOCUMENTS

| | | | | |
|---|---|---|---|---|
| 11,211,967 | B2 * | 12/2021 | Turkowski | H04B 1/50 |
| 12,040,772 | B2 * | 7/2024 | Lenhart | H03H 7/40 |
| 2009/0289735 | A1 * | 11/2009 | Womac | H03H 7/40 333/32 |
| 2013/0069737 | A1 * | 3/2013 | See | H04B 1/0458 333/32 |
| 2019/0281476 | A1 * | 9/2019 | Lyon | G06N 3/0499 |
| 2021/0123456 | A1 * | 4/2021 | Iwakiri | F04D 29/441 |

(Continued)

*Primary Examiner* — Harry H Kim
(74) *Attorney, Agent, or Firm* — Secant IP, P.L.L.C.

(57) ABSTRACT

A parameter adjustment method includes: inputting a testing signal into a radio frequency (RF) device to obtain an output signal generated by the RF device, using the output signal as a target signal to perform a determination procedure, wherein the determination procedure includes: determining whether a return loss of the target signal matches default specifications, inputting the target signal into a parameter adjustment model to obtain an adjustment scheme when the return loss does not match any one of the default specifications, wherein the adjustment scheme indicates an update electric parameter of the RF device, obtaining another output signal corresponding to the adjustment scheme from the RF device, using the another output signal as the target device to perform the determination procedure, and outputting a test result when the return loss matches the default specifications.

16 Claims, 5 Drawing Sheets

(56) References Cited

U.S. PATENT DOCUMENTS

| | | | | |
|---|---|---|---|---|
| 2022/0245505 | A1* | 8/2022 | Krishna | G06N 20/00 |
| 2023/0116417 | A1* | 4/2023 | Taccari | G06F 18/214 706/15 |
| 2023/0254003 | A1* | 8/2023 | Kostas | H04B 1/40 370/329 |
| 2023/0318536 | A1* | 10/2023 | Huang | H03F 3/45273 330/255 |
| 2024/0211670 | A1* | 6/2024 | Oguni | G06F 30/367 |
| 2024/0217547 | A1* | 7/2024 | Baric | B60W 50/0097 |
| 2024/0396641 | A1* | 11/2024 | Chandler | H04B 17/0085 |
| 2024/0408761 | A1* | 12/2024 | Iwanaga | B25J 15/0616 |

* cited by examiner

PARAMETER ADJUSTMENT METHOD AND SYSTEM USING PARAMETER ADJUSTMENT MODEL

CROSS-REFERENCE TO RELATED APPLICATIONS

This non-provisional application claims priority under 35 U.S.C. § 119 (a) on Patent Application No(s). 202410026329.9 filed in China on Jan. 8, 2024, the entire contents of which are hereby incorporated by reference.

BACKGROUND

1. Technical Field

This disclosure relates to a parameter adjustment method and system using a parameter adjustment model.

2. Related Art

An amplifier is one of the most important components in cable TV signal transmission system. The function of the amplifier is to amplify the radio frequency signal of the cable TV to compensate for attenuation of the signal caused by passive components such as cables and splitters in the transmission network. Therefore, the quality of the amplifier directly affects the quality of signal transmission, and the radio frequency characteristics of the amplifier are particularly critical.

SUMMARY

According to one or more embodiment of this disclosure, a parameter adjustment method includes: inputting a testing signal into a radio frequency device to obtain an output signal generated by the radio frequency device; using the output signal as a target signal to perform a determination procedure, wherein the determination procedure comprises determining whether a return loss of the target signal matches a plurality of default specifications; inputting the target signal into a parameter adjustment model to obtain an adjustment scheme when the return loss does not match any one of the plurality of default specifications, wherein the adjustment scheme indicates an update electric parameter of the radio frequency device; obtaining another output signal corresponding to the adjustment scheme from the radio frequency device; using the another output signal as the target signal to perform the determination procedure; and outputting a test result when the return loss matches the plurality of default specifications.

According to one or more embodiment of this disclosure, a parameter adjustment system includes: a testing device and a processing device. The testing device is connected to a radio frequency device, and configured to input a testing signal into the radio frequency device to obtain an output signal generated by the radio frequency device. The processing device is connected to the testing device, and configured to perform steps of: using the output signal as a target signal to perform a determination procedure, wherein the determination procedure comprises determining whether a return loss of the target signal matches a plurality of default specifications; inputting the target signal into a parameter adjustment model to obtain an adjustment scheme when the return loss does not match any one of the plurality of default specifications, wherein the adjustment scheme indicates an update electric parameter of the radio frequency device; obtaining another output signal corresponding to the adjustment scheme from the radio frequency device; using the another output signal as the target signal to perform the determination procedure; and outputting a test result when the return loss matches the plurality of default specifications.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Due to impedance matching and material errors, the radio frequency characteristics of traditional amplifiers need to be adjusted. This adjustment process includes some steps that requires operator to manually complete, such as welding etched capacitors, toggling in-line capacitors, rotating adjustable capacitors, rotating adjustable resistors, etc. However, the decision of whether or not to adjust and perform these steps of adjustment is usually determined based on the operator's practical experience. The adjustment efficiency greatly depends on the operator's experience and proficiency.

According to one aspect of the present disclosure, a parameter adjustment method and system using the same are provided. The parameter adjustment method and system using the same can lower difficulty in adjusting the RF device, improve adjustment efficiency and lower dependency on the operator's experience and proficiency.

According to one aspect of the present disclosure, by using a robotic arm (robots) to complete part or all of the adjustments, manual operation process may be reduced or replaced.

According to one aspect of the present disclosure, by adding a classifier layer to an unsupervised learning model before training, the processing device may train the initial model using a mixture of a small amount of labeled data and a large amount of unlabeled data to generate the parameter adjustment model.

According to the present disclosure, one or more features and conditions in any embodiment can be utilized in numerous combinations so as to achieve corresponding effects.

Figure 1:
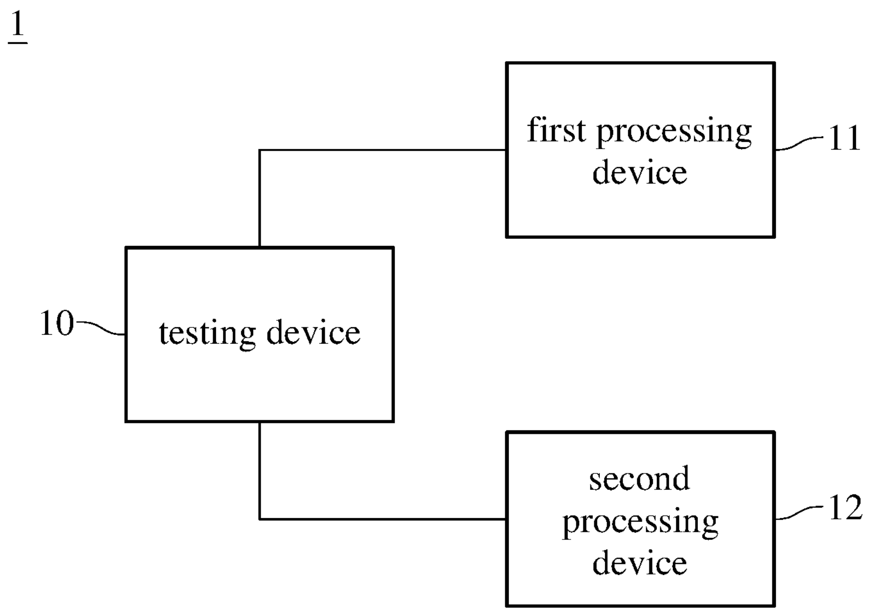
FIG. 1 is a block diagram illustrating a parameter adjustment system according to an embodiment of the present disclosure.

Please refer to FIG. 1, wherein FIG. 1 is a block diagram illustrating a parameter adjustment system according to an embodiment of the present disclosure. As shown in FIG. 1, the parameter adjustment system 1 may include a testing device 10, a first processing device 11 and a second processing device 12. The testing device 10 may be connected to the first processing device 11 and the second processing device 12.

The testing device 10 may be a radio frequency (RF) testing device configured to test one or more of output power and output frequency of a RF device. The RF device may be a RF device used for cable television, but the present disclosure is not limited thereto. The first processing device 11 may be configured to determine whether to adjust component parameter(s) of the RF device according to a test result of the RF device and a parameter adjustment model. The first processing device 11 and the second processing device 12 may be configured to train and store the parameter adjustment model. For example, the first processing device 11 may be a processing device at the application end of the parameter adjustment system 1, and the second processing device 12 may be a processing device at the supplier end of the parameter adjustment system 1. The first processing device 11 and the second processing device 12 may each include one or more processors, the processor is, for example, a central processing unit, a graphics processing unit, a microcontroller, a programmable logic controller or any other processors with signal processing functions. The second processing device 12 may be selectively disposed.

Further, the first processing device 11 may be connected to a display device and a robotic arm. When the first processing device 11 determines that the component parameter(s) of the RF device needs to be adjusted, the first processing device 11 may output a corresponding adjustment scheme to the robotic arm to control the robotic arm to perform the adjustment, and/or the first processing device 11 may output a corresponding adjustment scheme to the display device for the operator to perform the adjustment according to the displayed adjustment scheme.

Figure 2:
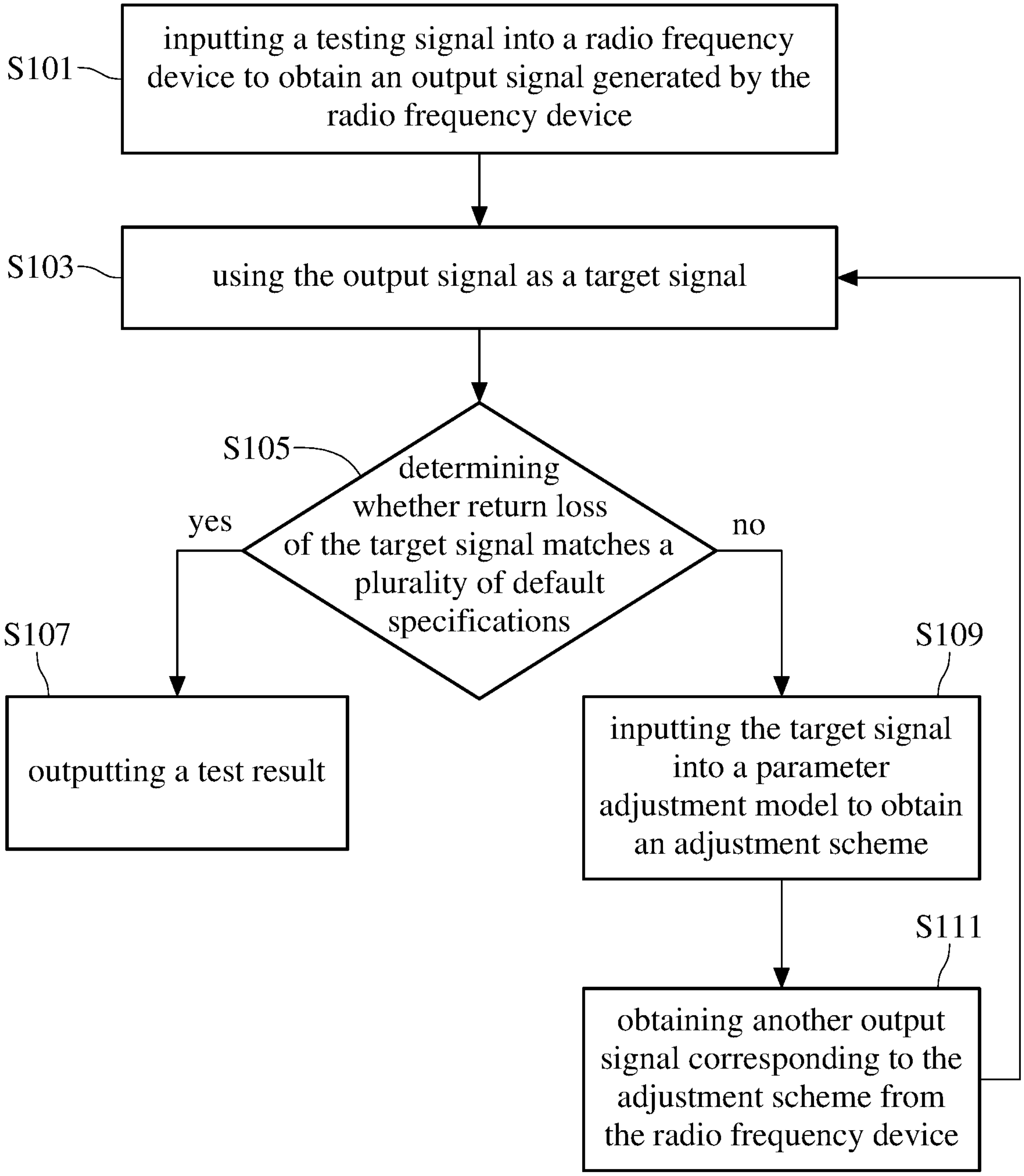
FIG. 2 is a flowchart illustrating a parameter adjustment method according to an embodiment of the present disclosure.

Please refer to FIG. 1 and FIG. 2, wherein FIG. 2 is a flowchart illustrating a parameter adjustment method according to an embodiment of the present disclosure. As shown in FIG. 2, the parameter adjustment method may include: step S101: inputting a testing signal into a radio frequency device to obtain an output signal generated by the radio frequency device; step S103: using the output signal as a target signal to perform a determination procedure, wherein the determination procedure includes step S105: determining whether a return loss of the target signal matches a plurality of default specifications; when the determination result of step S105 is "yes", performing step S107: outputting a test result; when the determination result of step S105 is "no", performing step S109: inputting the target signal into a parameter adjustment model to obtain an adjustment scheme; step S111: obtaining another output signal corresponding to the adjustment scheme from the radio frequency device; and performing step S103 again to use said another output signal as the target signal to perform the determination procedure (step S105).

In step S101, the first processing device 11 may control the testing device 10 to input the testing signal to the RF device to obtain the output signal generated by the RF device. For example, the testing signal may be at least one of a continuous wave signal, a pulse signal and a modulated signal, etc., but the present disclosure is not limited thereto.

In step S103 and step S105, the first processing device 11 may use the output signal as the target signal, and determine whether the return loss of the target signal matches the default specifications, wherein each of the default specifications may indicate a plurality of return loss upper limits corresponding to a plurality of frequency bands.

The following uses table 1 as an example to explain step S103 and step S105, wherein in table 1, the unit of the frequency bands is megahertz (MHz), and the unit of the default specifications is decibel (dB). In step S103, the first processing device 11 may divide the target signal into four sub-signals according to the four frequency bands shown in table 1, and determine whether each sub-signal matches specification 1 to specification 4. Specifically, the first processing device 11 may use the maximum return loss of each sub-signal to perform step S105.

TABLE 1

| | frequency band | | | |
|---|---|---|---|---|
| specification | 105~160 | 160~400 | 400~700 | 700~1218 |
| specification 1 | <−15 | <−13 | <−12 | <−10.5 |
| specification 2 | <−15.5 | <−17 | <−16.5 | <−17.5 |
| specification 3 | <−17 | <−17 | <−16.5 | <−17.5 |
| specification 4 | <−17 | <−17 | <−17.5 | <−17.5 |

Take a frequency band of 105~160 MHz as an example, in step S105, the first processing device 11 may determine whether the return loss of the sub-signal at the frequency band of 105~160 MHz is lower than −15 dB, −15.5 dB and −17 dB. As to one target signal divided into four sub-signals, when the first processing device 11 determines that the return loss of the sub-signal at the frequency band of 105~160 MHz is lower than −17 dB, and the return loss of the other three sub-signals are lower than −17.5 dB, respectively, the first processing device 11 may determine that the return loss of the target signal simultaneously matches the default specifications 1-4. Therefore, in step S107, the first processing device 11 may output the test result showing that the RF device passes the test, wherein the test result may be output to the display device, a memory or a cloud, etc.

Assuming that the return loss of the sub-signal corresponding to the frequency band of 105~160 MHz is −16 dB, the return loss of the sub-signal corresponding to the frequency band of 160~400 MHz is −16 dB, the return loss of the sub-signal corresponding to the frequency band of 400~700 MHz is −17 dB, and the return loss of the sub-signal corresponding to the frequency band of 700~1218 MHz is −18 dB. In the order of the four frequency bands from low to high, the determination result of the first processing device 11 is that the return loss of the target signal matches specification 1 but does not match specification 3, specification 2, and specification 4. Therefore, the first processing device 11 may determine that the return loss of the target signal does not match the default specifications.

In addition, as shown in table 1, the same frequency band may have identical or similar specification (for example, for the frequency band of 105~160 MHz, specification 3 and specification 4 has the same criterion). Through this design, the first processing device 11 may efficiently determine the target signal does not match with which specification of which frequency band.

Then, in step S109, the first processing device 11 may input the target signal into the parameter adjustment model to obtain the adjustment scheme, wherein the adjustment scheme may indicate an update electric parameter of the RF device. The parameter adjustment model may be a model generated by performing training using table 1 and the corresponding candidate adjustment schemes, and the parameter adjustment model may be a semi-supervised learning model. The update electric parameter may include adjustments to various components in the RF device, such as adjustment to an inductance value, a capacitance and/or a resistance of a component. For example, the update electric parameter may indicate toggling in-line capacitors in the RF device, rotating adjustable capacitors in the RF device, rotating adjustable resistors in the RF device, etc. to adjust the inductance value, the capacitance and/or the resistance.

In step S111, the first processing device 11 may control the testing device 10 to input the testing signal to the RF device, which has been adjusted according to the adjustment scheme, to obtain another output signal generated by the RF device. Then, the first processing device 11 may use said another output signal as the target signal and perform the determination procedure again.

The parameter adjustment method and system using parameter adjustment model according to the above embodiment may lower difficulty in adjusting the RF device, improve adjustment efficiency, and lower dependency on the operator's experience and proficiency.

Figure 3:
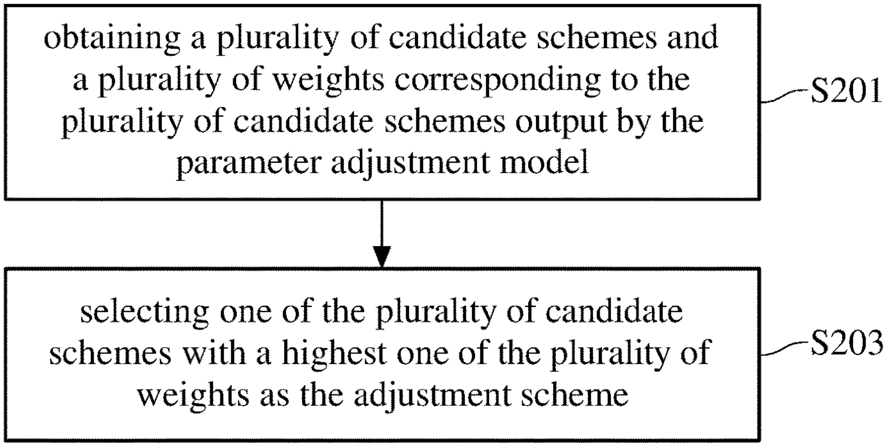
FIG. 3 is a flowchart illustrating selecting an adjustment scheme according to an embodiment of the present disclosure.

Please refer to FIG. 1 and FIG. 3, wherein FIG. 3 is a flowchart illustrating selecting an adjustment scheme according to an embodiment of the present disclosure. FIG. 3 may be regarded as a detail flowchart of an embodiment of step S109 of FIG. 2. As shown in FIG. 3, selecting the adjustment scheme may include: step S201: obtaining a plurality of candidate schemes and a plurality of weights corresponding to the plurality of candidate schemes output by the parameter adjustment model; and step S203: selecting one of the plurality of candidate schemes with a highest one of the plurality of weights as the adjustment scheme.

After inputting the target signal into the parameter adjustment model, in step S201, the first processing device 11 may obtain the candidate schemes and the weight of each of the candidate schemes from the parameter adjustment model. Specifically, the weights may be positively related to the performance of the RF device. In other words, when the weight is higher, it represents that the RF device might have better performance (i.e. decrease of return loss) after the RF device is adjusted based on the candidate scheme corresponding to the weight.

Therefore, in step S203, the first processing device 11 may select the candidate scheme corresponding to a highest one of the weights as the adjustment scheme described above.

Figure 4:
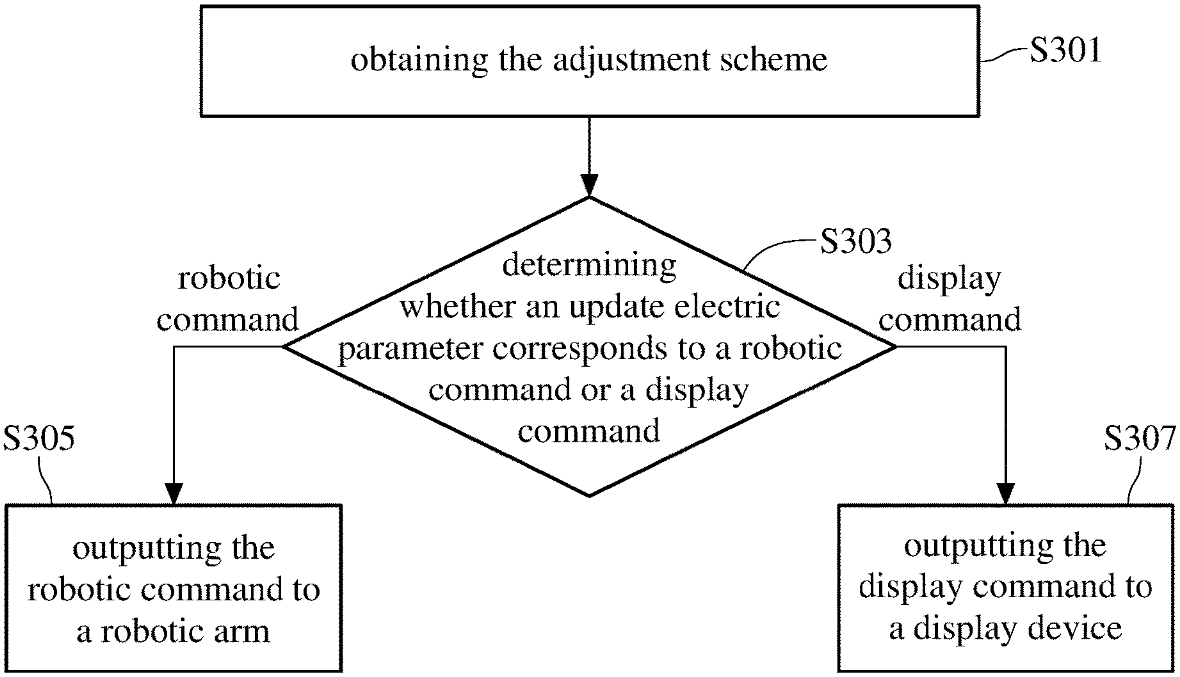
FIG. 4 is a flowchart illustrating outputting a command according to an embodiment of the present disclosure.

Please refer to FIG. 1 and FIG. 4, wherein FIG. 4 is a flowchart illustrating outputting a command according to an embodiment of the present disclosure. Steps S303, S305 and S307 shown in FIG. 4 may be performed after step S109 of FIG. 2, and may be performed before or after step S111 of FIG. 2, or steps S303, S305 and S307 may be performed in parallel with step S111. As shown in FIG. 4, outputting a command may include: step S301: obtaining the adjustment scheme; step S303: determining whether the update electric parameter corresponds to a robotic command or a display command; when the determination result of step S303 is said "robotic command", performing step S305: outputting the robotic command to the robotic arm; and when the determination result of step S303 is said "display command", performing step S307: outputting the display command to the display device. Step S301 may be the same as step S109 of FIG. 2, its detail description is not repeated herein.

In step S303, the first processing device 11 may determine whether the update electric parameter indicated by the adjustment scheme corresponds to the robotic command or the display command. For example, the first processing device 11 may pre-store corresponding relationships between various components in the RF device and the robotic arm or the display device. Accordingly, when the corresponding relationship indicates that a to-be-adjusted component corresponding to the update electric parameter corresponds to the robotic arm, the first processing device 11 may determine that the update electric parameter corresponds to the robotic command; when the corresponding relationship indicates that the to-be-adjusted component corresponding to the update electric parameter corresponds to the display device, the first processing device 11 may determine that the update electric parameter corresponds to the display command.

When the first processing device 11 determines that the update electric parameter corresponds to the robotic command, in step S305, the first processing device 11 may output the robotic command to the robotic arm to control the robotic arm to adjust the to-be-adjusted component. When the first processing device 11 determines that the update electric parameter corresponds to the display command, in step S307, the first processing device 11 may output the display command to the display device to control the display device to display the update electric parameter.

Accordingly, by using the robotic arm (robots) to complete part or all of the adjustments, manual operation process may be reduced or replaced.

Figure 5:
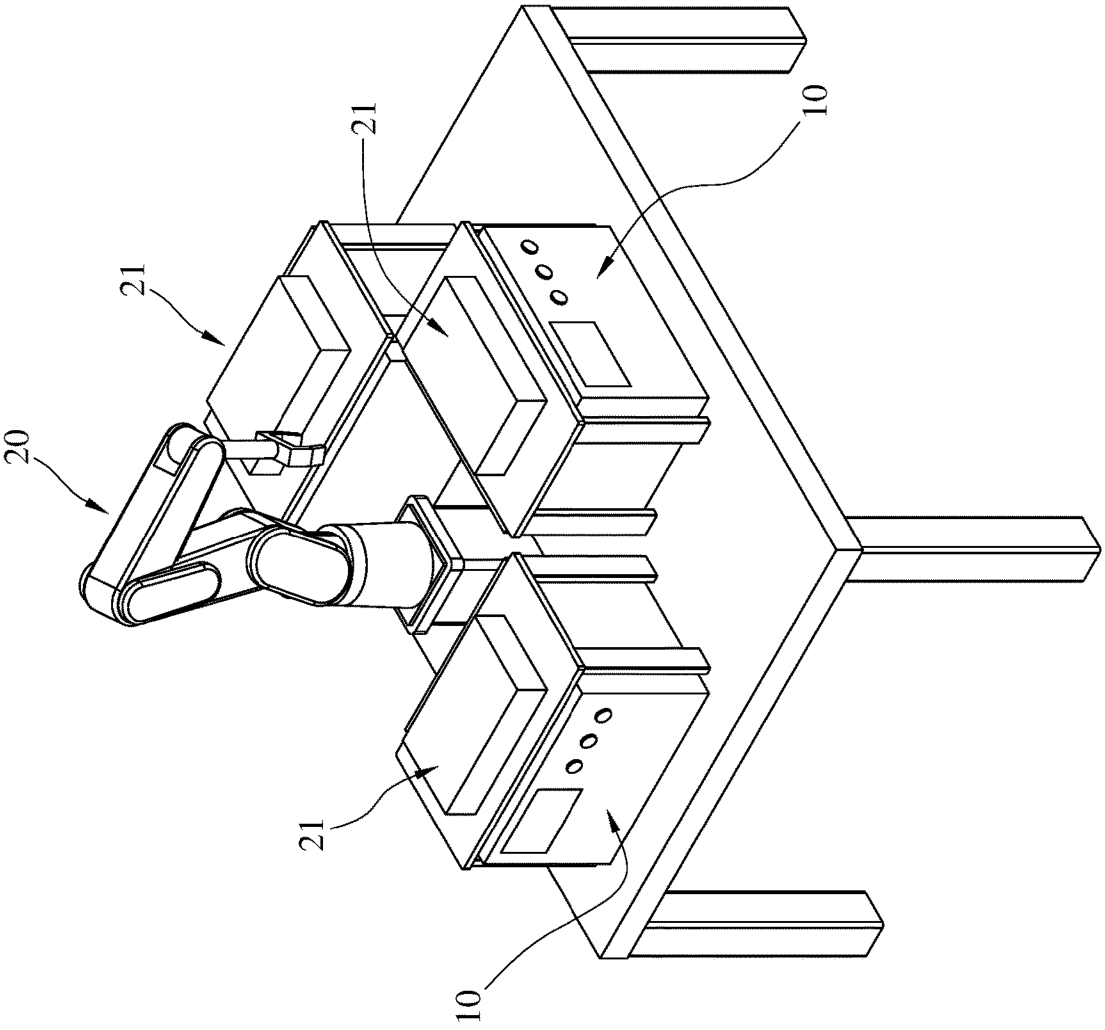
FIG. 5 is a schematic diagram illustrating a parameter adjustment method according to an embodiment of the present disclosure.

Please refer to FIG. 1 and FIG. 5, wherein FIG. 5 is a schematic diagram illustrating a parameter adjustment method according to an embodiment of the present disclosure. As shown in FIG. 5, one testing device 10 may be configured to perform testing on one RF device 21, as described with reference to step S101 of FIG. 2. Further, when the update electric parameter corresponds to the robotic command, the first processing device 11 may output the update electric parameter to the robotic arm 20 for the robotic arm 20 to adjust one or more RF devices 21. Specifically, the RF device 21 may have a shell, and during the testing and the adjustment described with reference to FIG. 5, the shell may be opened to allow the robotic arm 20 (or the operator) to adjust the components in the RF device 21 according to the update electric parameter.

Figure 6:
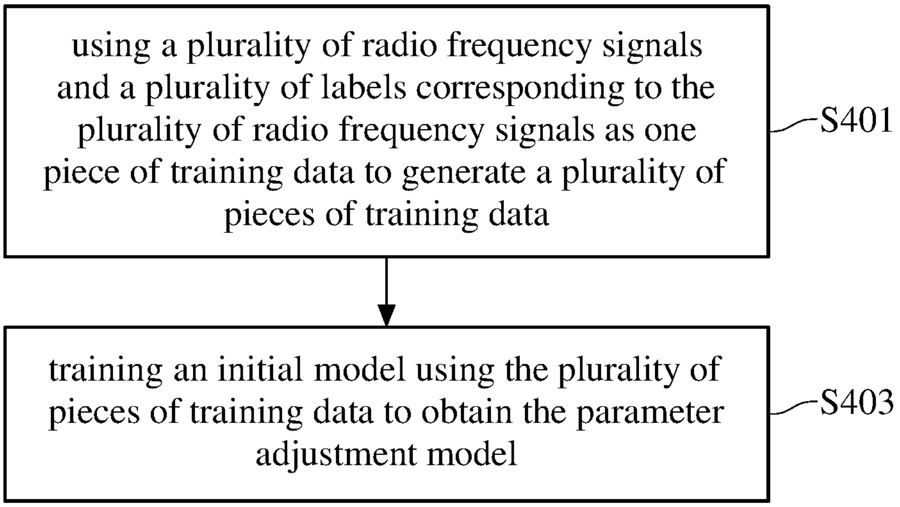
FIG. 6 is a flowchart illustrating model training according to an embodiment of the present disclosure.

Please refer to FIG. 1 and FIG. 6, wherein FIG. 6 is a flowchart illustrating model training according to an embodiment of the present disclosure. As shown in FIG. 6, the model training may include: step S401: using a plurality of radio frequency signals and a plurality of labels corresponding to the plurality of radio frequency signals as one piece of training data to generate a plurality of pieces of training data; and step S403: training an initial model using the plurality of pieces of training data to obtain the parameter adjustment model. As described above, steps shown in FIG. 6 may be performed by the first processing device 11 or the second processing device 12. The following uses the first processing device 11 to explain steps shown in FIG. 6.

In step S401, the first processing device 11 may generate the pieces of training data, and each piece of training data may include data of multiple RF signals and the corresponding labels, wherein the method of generating the RF signals may be the same as the method of generating the output signal (step S101 in FIG. 2), its detail description is not repeated herein. Each label may include a fail specification among the default specifications and a default adjustment scheme corresponding to the fail specification. Each default specification may indicate multiple return loss upper limits corresponding to multiple frequency bands, and the return loss upper limit corresponding to each frequency band may be arranged in the order from highest to lowest. The following uses table 2 as an example to explain the training data, wherein in table 2, the unit of the frequency bands is megahertz (MHz), and the unit of the default specifications is decibel (dB). In table 2, the frequency bands are 105~160 MHz, 160~400 MHz, 400~700 MHz and 700~1218 MHz, respectively; the default specifications are specification 1 to specification 4, and the return loss upper limits of each frequency band are associated with priority levels of the plurality of default specifications. Take the frequency bands of 105~160 MHz for example, the return loss upper limits are −15 dB, −15.5 dB and −17 dB for various specifications. The priority level may be positively related to the return loss upper limit. For example, the lower the return loss upper limit, the lower the priority level may be. In table 2, the priority level of specification 1 may be higher than the priority level of specification 2, the priority level of specification 2 may be higher than the priority level of specification 3, and the priority level of specification 3 may be higher than the priority level of specification 4. Therefore, when the return loss of the RF signal does not match multiple specifications, the first processing device 11 may select the scheme corresponding to the specification with the highest priority level to generate the labels of the training data. Further, scheme 1 to scheme 4 may be update electric parameters set according to operator's experiences.

TABLE 2

| | frequency bands | | | | |
|---|---|---|---|---|---|
| specification | 105~160 | 160~400 | 400~700 | 700~1218 | scheme |
| specification 1 | <−15 | <−13 | <−12 | <−10.5 | scheme 1 |
| specification 2 | <−15.5 | <−17 | <−16.5 | <−17.5 | scheme 2 |
| specification 3 | <−17 | <−17 | <−16.5 | <−17.5 | scheme 3 |
| specification 4 | <−17 | <−17 | <−17.5 | <−17.5 | scheme 4 |

Take the frequency band of 105~160 MHz as an example, assuming that the return loss of one RF signal is lower than −15.5 dB but not lower than −17 dB, it represents that the RF signal does not match specifications 3 and 4. Therefore, the specifications 3 and 4 are the fail specification. Since specification 3 enjoys higher priority level than specification 4, scheme 3 corresponding to specification 3 is the default adjustment scheme, and specification 3 and scheme 3 are the labels of the RF signal. In addition, assuming that the return loss of one RF signal at the frequency band 105~160 MHz is lower than −17 dB, and the return loss at the frequency bands 400~700 MHz is lower than −16.5 dB but not lower than −17.5 dB, it represents that the RF signal does not match specification 4. Therefore, specification 4 is the fail specification, and scheme 4 corresponding to specification 4 is the default adjustment scheme, and specification 4 and scheme 4 are the labels of the RF signal.

In step S403, the first processing device 11 may use the pieces of training data to train the initial model to obtain the parameter adjustment model, wherein the parameter adjustment model generated in step S403 may be used as the parameter adjustment model in step S109 of FIG. 2.

It should be noted that before training the initial model, the first processing device 11 may add a classifier layer to an unsupervised learning model to generate the initial model. The classifier layer may be used as a fully connected layer in an artificial neural network. The fully connected layer may allow the model to perform classification after the model is trained. The fully connected layer may be created through a dense function in TensorFlow deep learning structure, and may use rectified linear unit (ReLU) as an activation function, wherein the activation function may effectively process nonlinear relationship.

Moreover, the initial model may be a semi-supervised learning model, and a quantity of the labels may be smaller than a quantity of the RF signals. In other words, the first processing device 11 may only label a portion of the RF signals to generate the labels. Therefore, the initial model may be trained using a mixture of a small amount of labeled data and a large amount of unlabeled data to generate the parameter adjustment model.

In view of the above description, the parameter adjustment method and system using parameter adjustment model according to one or more embodiments of the present disclosure may lower difficulty in adjusting the RF device, improve adjustment efficiency and lower dependency on the operator's experience and proficiency.

What is claimed is:

1. A parameter adjustment method, comprising:

inputting a testing signal into a radio frequency device to obtain an output signal generated by the radio frequency device;

using the output signal as a target signal to perform a determination procedure, wherein the determination procedure comprises determining whether a return loss of the target signal matches a plurality of default specifications;

using a plurality of radio frequency signals and a plurality of labels corresponding to the plurality of radio frequency signals as one piece of training data to generate a plurality of pieces of training data, wherein each of the plurality of labels comprises a fail specification among the plurality of default specifications and a default adjustment scheme corresponding to the fail specification;

training an initial model using the plurality of pieces of training data to obtain a parameter adjustment model;

inputting the target signal into the parameter adjustment model to obtain an adjustment scheme when the return loss does not match any one of the plurality of default specifications, wherein the adjustment scheme indicates an update electric parameter of the radio frequency device including adjustments to an inductance, capacitance and/or resistance of a component in the radio frequency device, the update electric parameter corresponds to a robotic command;

outputting the robotic command to a robotic arm to adjust inductance, capacitance and/or resistance of a component in the radio frequency device;

obtaining another output signal corresponding to the adjustment scheme from the radio frequency device;

using the another output signal as the target signal to perform the determination procedure; and outputting a test result when the return loss matches the plurality of default specifications.

2. The parameter adjustment method according to claim 1, wherein each of the plurality of default specifications indicates a plurality of return loss upper limits corresponding to a plurality of frequency bands.

3. The parameter adjustment method according to claim 1, wherein the parameter adjustment model is a semi-supervised learning model.

4. The parameter adjustment method according to claim 1, wherein inputting the target signal into the parameter adjustment model to obtain the adjustment scheme comprises:

obtaining a plurality of candidate schemes and a plurality of weights corresponding to the plurality of candidate schemes output by the parameter adjustment model; and selecting one of the plurality of candidate schemes with a highest one of the plurality of weights as the adjustment scheme.

5. The parameter adjustment method according to claim 1, wherein each of the plurality of default specifications indicates a plurality of return loss upper limits corresponding to a plurality of frequency bands.

6. The parameter adjustment method according to claim 5, wherein the plurality of return loss upper limits corresponding to each of the plurality of frequency bands are associated with a plurality of priority levels of the plurality of default specifications.

7. The parameter adjustment method according to claim 1, wherein a quantity of the plurality of labels is smaller than a quantity of the plurality of radio frequency signals.

8. The parameter adjustment method according to claim 1, further comprising:

adding a classifier layer to an unsupervised learning model to generate the initial model.

9. A parameter adjustment system, comprising:

a testing device connected to a radio frequency device, and configured to input a testing signal into the radio frequency device to obtain an output signal generated by the radio frequency device; and a processing device connected to the testing device, and configured to perform:

using the output signal as a target signal to perform a determination procedure, wherein the determination procedure comprises determining whether a return loss of the target signal matches a plurality of default specifications;

using a plurality of radio frequency signals and a plurality of labels corresponding to the plurality of radio frequency signals as one piece of training data to generate a plurality of pieces of training data, wherein each of the plurality of labels comprises a fail specification among the plurality of default specifications and a default adjustment scheme corresponding to the fail specification;

training an initial model using the plurality of pieces of training data to obtain a parameter adjustment model;

inputting the target signal into the parameter adjustment model to obtain an adjustment scheme when the return loss does not match any one of the plurality of default specifications, wherein the adjustment scheme indicates an update electric parameter of the radio frequency device including adjustments to an inductance, capacitance and/or resistance of a component in the radio frequency device, the update electric parameter corresponds to a robotic command;

obtaining another output signal corresponding to the adjustment scheme from the radio frequency device;

using the another output signal as the target signal to perform the determination procedure; and outputting a test result when the return loss matches the plurality of default specifications.

10. The parameter adjustment system according to claim 9, wherein each of the plurality of default specifications indicates a plurality of return loss upper limits corresponding to a plurality of frequency bands.

11. The parameter adjustment system according to claim 9, wherein the parameter adjustment model is a semi-supervised learning model.

12. The parameter adjustment system according to claim 9, wherein the processing device obtains a plurality of candidate schemes and a plurality of weights corresponding to the plurality of candidate schemes output by the parameter adjustment model, and selects one of the plurality of candidate schemes with a highest one of the plurality of weights as the adjustment scheme.

13. The parameter adjustment system according to claim 9, wherein each of the plurality of default specifications indicates a plurality of return loss upper limits corresponding to a plurality of frequency bands.

14. The parameter adjustment system according to claim 13, wherein the plurality of return loss upper limits corresponding to each of the plurality of frequency bands are associated with a plurality of priority levels of the plurality of default specifications.

15. The parameter adjustment system according to claim 9, wherein a quantity of the plurality of labels is smaller than a quantity of the plurality of radio frequency signals.

16. The parameter adjustment system according to claim 9, wherein the processing device is further configured to add a classifier layer to an unsupervised learning model to generate the initial model.

* * * * *